US012699024B2

(12) United States Patent
Brace et al.

(10) Patent No.: US 12,699,024 B2
(45) Date of Patent: Aug. 4, 2026

(54) ILLUMINATING FIBERS OF A FIBER OPTIC CABLE

(71) Applicant: VIAVI Solutions Inc., Chandler, AZ (US)

(72) Inventors: Jay Gregory Brace, Seattle, WA (US); Robert Matthew Adams, Ottawa (CA); Eugene Chan, Kanata (CA)

(73) Assignee: VIAVI Solutions Inc., Chandler, AZ (US)

( * ) Notice: Subject to any disclaimer, the term of this patent is extended or adjusted under 35 U.S.C. 154(b) by 373 days.

(21) Appl. No.: 18/191,545

(22) Filed: Mar. 28, 2023

(65) Prior Publication Data

US 2024/0328896 A1      Oct. 3, 2024

(51) Int. Cl.
G01M 11/00          (2006.01)

(52) U.S. Cl.
CPC ............ G01M 11/33 (2013.01); G01M 11/00 (2013.01)

(58) Field of Classification Search
CPC . G01M 11/33; G01M 11/3136; G01M 11/088
See application file for complete search history.

(56) References Cited

U.S. PATENT DOCUMENTS

| | | | | |
|---|---|---|---|---|
| 5,327,514 A | * | 7/1994 | Dujon | ................ H04N 1/19589 |
| | | | | 385/115 |
| 2011/0013905 A1 | * | 1/2011 | Wang | ..................... G01M 11/33 |
| | | | | 398/21 |
| 2019/0170610 A1 | * | 6/2019 | Perron | ................... G01M 11/33 |
| 2020/0124498 A1 | | 4/2020 | Leclerc et al. | |
| 2020/0264397 A1 | | 8/2020 | Herman et al. | |

FOREIGN PATENT DOCUMENTS

JP          2003086384 A  *  3/2003

OTHER PUBLICATIONS

Extended European Search Report for European Application No. EP24162738 dated Sep. 4, 2024, 8 pages.

* cited by examiner

*Primary Examiner* — Abdullahi Nur
(74) *Attorney, Agent, or Firm* — Harrity & Harrity, LLP

(57) ABSTRACT

In some implementations, a device may selectively illuminate, via a lighting module of the device, one or more fibers in a fiber optic cable using an illumination pattern. The device may detect, via a detection module of the device, illuminated fibers associated with the fiber optic cable based on the illumination pattern. The device may output, via the detection module of the device, information regarding the illuminated fibers. The device may generate, via one or more processors of the device, a report, based on the information, indicating a fiber mapping between the one or more fibers that were selectively illuminated via the lighting module and the illuminated fibers detected via the detection module.

20 Claims, 5 Drawing Sheets

300

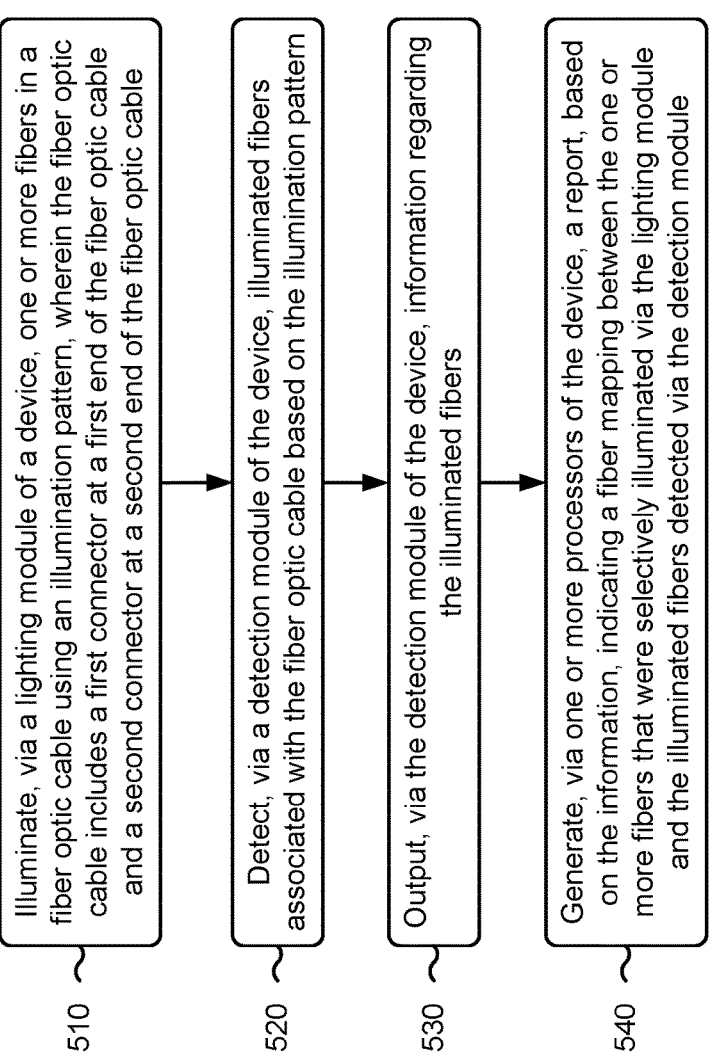

510 — Illuminate, via a lighting module of a device, one or more fibers in a fiber optic cable using an illumination pattern, wherein the fiber optic cable includes a first connector at a first end of the fiber optic cable and a second connector at a second end of the fiber optic cable 520 — Detect, via a detection module of the device, illuminated fibers associated with the fiber optic cable based on the illumination pattern 530 — Output, via the detection module of the device, information regarding the illuminated fibers 540 — Generate, via one or more processors of the device, a report, based on the information, indicating a fiber mapping between the one or more fibers that were selectively illuminated via the lighting module and the illuminated fibers detected via the detection module

ILLUMINATING FIBERS OF A FIBER OPTIC CABLE

BACKGROUND

Fiber optic cables may be used for data centers or for local area network (LAN) applications. Fiber optic cables may be composed of multiple fibers, which may be able to handle relatively high bandwidths. In a specific example, a multiple-fiber push-on (MPO) cable may be a fiber optic cable composed of multiple optical fibers. MPO cables may be used for high-density cabling in data centers, as MPO cables may be capable of accommodating the multiple optical fibers within a single interface, which may largely increase network capacity, save space, and offer ease of cable management.

SUMMARY

In some implementations, a device includes a lighting module configured to selectively illuminate, using an illumination pattern, one or more fibers in a fiber optic cable, wherein the fiber optic cable includes a first connector at a first end of the fiber optic cable and a second connector at a second end of the fiber optic cable; a detection module configured to: detect, based on the illumination pattern, illuminated fibers associated with the fiber optic cable; and output information regarding the illuminated fibers; and one or more processors configured to generate a report, based on the information, indicating a fiber mapping between the one or more fibers that were selectively illuminated via the lighting module and the illuminated fibers detected via the detection module.

In some implementations, a method includes illuminating, via a lighting module of a device, one or more fibers in a fiber optic cable using an illumination pattern, wherein the fiber optic cable includes a first connector at a first end of the fiber optic cable and a second connector at a second end of the fiber optic cable; detecting, via a detection module of the device, illuminated fibers associated with the fiber optic cable based on the illumination pattern; outputting, via the detection module of the device, information regarding the illuminated fibers; and generating, via one or more processors of the device, a report, based on the information, indicating a fiber mapping between the one or more fibers that were selectively illuminated via the lighting module and the illuminated fibers detected via the detection module.

In some implementations, a system includes a fiber optic cable; a lighting module configured to selectively illuminate, using an illumination pattern, one or more fibers in the fiber optic cable; and a detection module configured to: detect, based on the illumination pattern, illuminated fibers associated with the fiber optic cable; and generate information regarding a fiber mapping between the one or more fibers that were selectively illuminated via the lighting module and the illuminated fibers detected via the detection module.

BRIEF DESCRIPTION OF THE DRAWINGS

FIG. 5 is a flowchart of an example process relating to illuminating fibers of a fiber optic cable.

DETAILED DESCRIPTION

Figure 1:
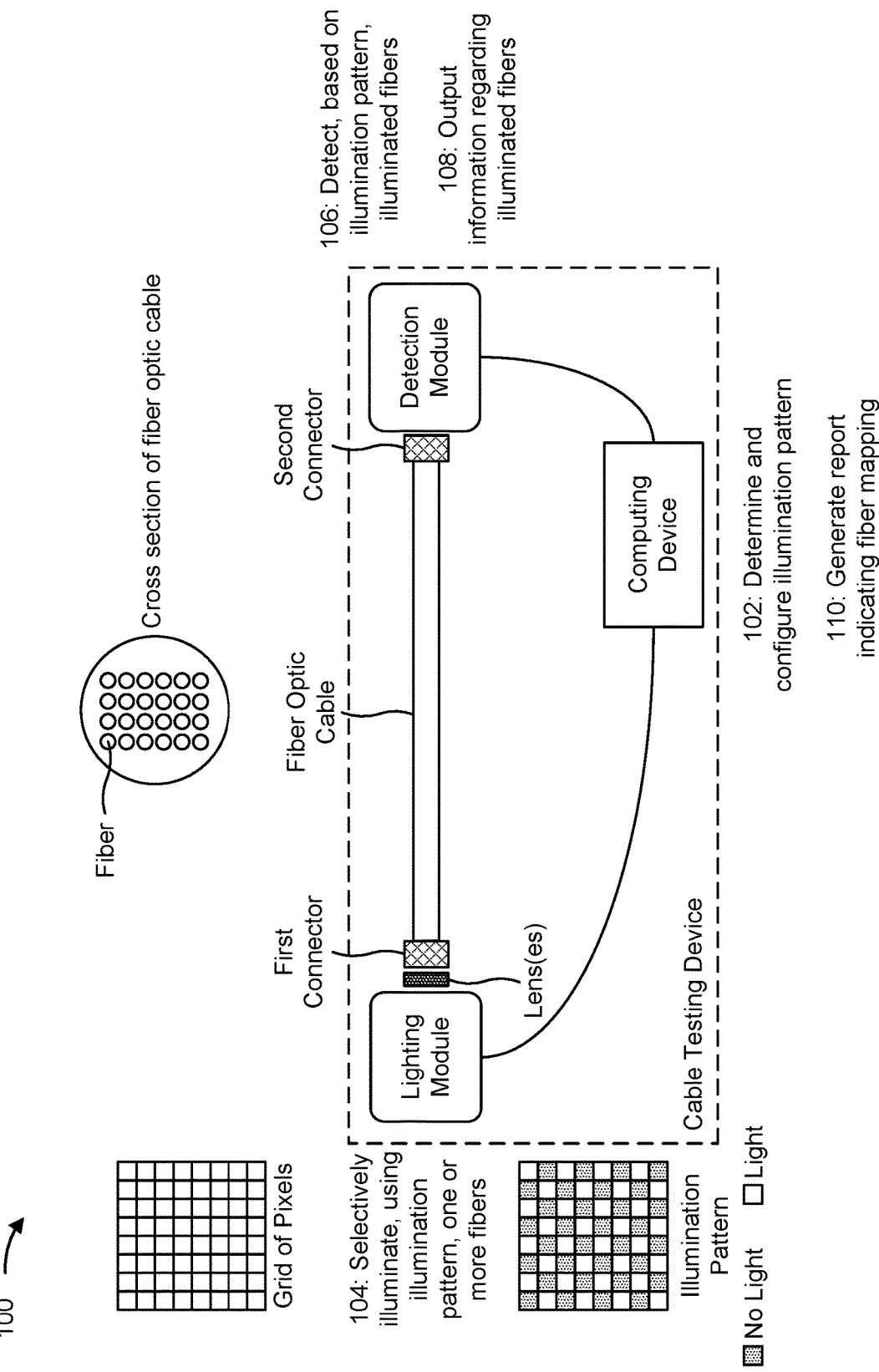
FIG. 1 is a diagram of an example associated with illuminating fibers of a fiber optic cable.

The following detailed description of example implementations refers to the accompanying drawings. The same reference numbers in different drawings may identify the same or similar elements.

A fiber optic cable may be used for data centers and/or for local area network (LAN) applications. The fiber optic cable may be composed of multiple fibers, which may be able to handle relatively high bandwidths. In a specific example, a multiple-fiber push-on (MPO) cable may be a fiber optic cable composed of multiple optical fibers. The fiber optic cable may be tested during a manufacturing of the fiber optic cable, during or after installation of the fiber optic cable, and/or during a lifespan of the fiber optic cable. The fiber optic cable may be tested to ensure proper functionality. For example, the fiber optic cable may be tested to ensure that all fibers of the fiber optic cable are properly connected without any breaks. The fiber optic cable may be tested to diagnose a problem associated with the fiber optic cable (e.g., a broken fiber). For example, individual fibers of the fiber optic cable may be damaged, and which fibers are damaged may need to be detected. Existing solutions for testing fiber optic cables may involve moving components for directing light when detecting certain fibers, which may decrease accuracy, and may only work for certain fiber configurations.

In some implementations, a lighting module may be used to selectively illuminate fibers on one end of a fiber optic cable. The lighting module may use an illumination pattern to selectively illuminate the fibers. For example, the lighting module may include a plurality of pixels, and a certain pattern of pixels matching a certain fiber configuration may be used to selectively illuminate the fibers. A detection module (e.g., a microscope) on the other end of the fiber optic cable may be used to determine which fibers are illuminated and which fibers are not illuminated. The detection module may store information regarding the illumination pattern, which may allow the detection module to determine which fibers are illuminated and which fibers are not illuminated. In some cases, all fibers illuminated by the lighting module may be detected as illuminated fibers by the detection module, which may indicate that these fibers have no breakages. In other cases, only some fibers illuminated by the lighting module may be detected as illuminated fibers by the detection module, which may indicate that certain fibers have breakages. A broken fiber that is illuminated may not be detected as an illuminated fiber by the detection module because light may not pass through the broken fiber. The detection module, or a separate processor, may generate a report indicating a fiber mapping. The fiber mapping may indicate which fibers, if any, are associated with breakages.

In some implementations, the illumination pattern may be tailored to the fiber configuration, such that any type of fiber optic cable may be analyzed. Further, the lighting module may be able to selectively illuminate certain fibers without using moving parts to direct light, which may improve a selectivity when illuminating the certain fibers. As a result, the lighting module and the detection module may be used in conjunction to accurately analyze fiber optic cables.

FIG. 1 is a diagram of an example 100 associated with illuminating fibers of a fiber optic cable. As shown in FIG.

1, example 100 includes a cable testing device, which includes a lighting module, a detection module, and a computing device. These devices are described in more detail in connection with FIGS. 3 and 4.

In some implementations, a cable testing device may include the lighting module, the detection module, and the computing device. The lighting module, the detection module, and the computing device may be separate entities of the cable testing device. The lighting module may connect with the computing device via a wired connection (as shown) or a wireless connection. The detection module may connect with the computing device via a wired connection (as shown) or a wireless connection. The computing device may include a display screen to display information associated with a cable testing. Alternatively, the cable testing device may only include the lighting module and the detection module. The computing device may be a general-purpose computer (e.g., a laptop). The computing device may download software that enables the computing device to communicate with the lighting module and the detection module. The computing device may communicate with the lighting module and the detection module via wired connections or via wireless connections.

In some implementations, the cable testing device may be used to test a fiber optic cable. The cable testing device may test the fiber optic cable during a manufacturing of the fiber optic cable. The cable testing device may test the fiber optic cable during an installation of the fiber optic cable. The cable testing device may test the fiber optic cable during a lifespan of the fiber optic cable (e.g., after the fiber optic cable is in the field). The fiber optic cable may include a first connector, which may be at a first end of the fiber optic cable. The fiber optic cable may include a second connector, which may be at a second end of the fiber optic cable. During a setup of the cable testing device and the fiber optic cable, the first connector of the fiber optic cable may be coupled (e.g., connected) to the lighting module, and the second connector of the fiber optic cable may be coupled to the detection module. Alternatively, during the setup, the first connector of the fiber optic cable may be placed within a first distance from the lighting module, and the second connector of the fiber optic cable may be placed within a second distance from the detection module. The first distance and the second distance may satisfy a distance threshold. For example, the first distance and the second distance may each be a relatively small distance.

In some implementations, the cable testing device may be used to test the fiber optic cable to ensure that the fiber optic cable is functioning properly. During the manufacturing or the installation of the fiber optic cable, the cable testing device may be used to proactively check whether different fibers of the fiber optic cable are continuous (e.g., no breaks in the fiber). In some implementations, the fiber optic cable may be exhibiting some problem after the fiber optic cable is installed in the field. For example, the fiber optic cable may be non-operational, or the fiber optic cable may be associated with a degraded data rate, which may be indicative of a problem with one or more fibers of the fiber optic cable. In this case, the cable testing device may be used to diagnose the problem associated with the fiber optic cable. For example, the cable testing device may be used to detect which fibers of the fiber optic cable are broken, and such information may be provided to a user associated with the cable testing device. The cable testing device may be a mobile device, which may allow the cable testing device to be used during the installation of the fiber optic cable and/or in the field.

As shown by reference number 102, the computing device may determine an illumination pattern. The illumination pattern may be used by the lighting module when selectively illuminating one or more fibers in the fiber optic cable. The illumination pattern may be used by the detection module when detecting illuminated fibers associated with the fiber optic cable. The illumination pattern may refer to which pixels of the lighting module are turned on or turned off, and the specific order of such pixels, when selectively illuminating the one or more fibers. The illumination pattern may define that only some pixels are turned on, while other pixels are turned off, when selectively illuminating the one or more fibers. The illumination pattern may define that a first group of pixels are turned on first, a second group of pixels are turned on second, and so on.

In some implementations, the computing device may determine a fiber configuration associated with the fiber optic cable. For example, the computing device may receive an input, via a user interface, from the user associated with the cable testing device. The input may indicate the fiber configuration associated with the fiber optic cable. The fiber configuration may be a straight fiber configuration, a crossover fiber configuration, a duplex fiber configuration, or another type of fiber configuration. The fiber configuration may be associated with a certain grid of fibers (e.g., 1×12, 2×12, 3×24, 4×16, and so on). The fiber configuration may be associated with certain fiber characteristics, such as row spacing, column spacing, core size, and/or cladding size. The computing device may select the illumination pattern based on the fiber configuration associated with the fiber optic cable. Each possible fiber configuration may be associated with a corresponding illumination pattern. The computing device may store, in a memory of the computing device, the different illumination patterns corresponding with the possible fiber configurations. Alternatively, the input may indicate a model number associated with the fiber optic cable. The computing device may determine, based on the model number, the fiber configuration associated with the fiber optic cable. For example, the computing device may maintain a listing of model numbers and corresponding fiber configurations. Depending on the fiber configuration, the computing device may determine the illumination pattern.

In some implementations, the computing device may not receive information regarding the fiber configuration associated with the fiber optic cable. For example, the fiber configuration may be unknown to the user associated with the cable testing device. In this case, the computing device may select a default illumination pattern. The default illumination pattern may not be tailored to a specific fiber configuration, but rather may generally apply to a plurality of different fiber configurations.

In some implementations, the computing device may configure the lighting module and/or the detection module with the illumination pattern. The computing device may configure the lighting module with the illumination pattern to enable the lighting module to selectively illuminate the one or more fibers in the fiber optic cable. The computing device may configure the detection module with the illumination pattern to enable the detection module to detect illuminated fibers associated with the fiber optic cable.

As shown by reference number 104, the lighting module may selectively illuminate, using the illumination pattern, the one or more fibers in the fiber optic cable. The lighting module may use a separate collimated light source that is able to shine through a display panel (e.g., a liquid crystal display (LCD) panel), where an amount of light may be controlled (e.g., increased or decreased) as needed by the lighting module. The lighting module may be a combination of a light source, collimation optics, and an LCD panel. In some cases, the lighting module may be a high-resolution LCD with a backlight, where the backlight may have a sufficient amount of brightness, or the lighting module may be an organic light-emitting diode (OLED) display. The lighting module may be used to selectively illuminate the one or more fibers on one end of the fiber optic cable. The lighting module may be composed of a grid of pixels. Individual pixels of the grid of pixels may be turned on and turned off, in accordance with the illumination pattern, to selectively illuminate the one or more fibers. Pixels that are turned on may allow light from the separate collimated light source to pass, whereas pixels that are turned off may cause light to not pass. The pixels may selectively pass and project collimated light into the one or more fibers. By turning on certain pixels and turning off certain pixels, in a particular order, the lighting module may be able to selectively illuminate the one or more fibers in the fiber optic cable. For example, one end of the one or more fibers may be coupled to or placed near the lighting module, and selective pixels may be enabled to allow light to pass and project into cores of the one or more fibers. In some cases, the lighting module may illuminate all of the fibers in the fiber optic cable, depending on the illumination pattern. In other cases, the lighting module may only illuminate a subset of the fibers in the fiber optic cable, depending on the illumination pattern.

As an example, the fiber optic cable may be a 24 fiber MPO cable, which may be composed of a 4×6 grid of fibers. The lighting module may be a grid of pixels, which may be overlaid on top of a connector associated with the 24 fiber MPO cable. When the lighting module turns on and off different pixels in the grid of pixels, different fibers in the 4×6 grid of fibers may be illuminated.

As shown by reference number 106, the detection module may detect, based on the illumination pattern, illuminated fibers associated with the fiber optic cable. The detection module may be a microscope or another type of device suitable to image or detect light. The detection module may or may not include microscope optics. The detection module may detect the illuminated fibers via the other end of the fiber optic cable. The detection module may scan the other end of the fiber optic cable in order to detect the illuminated fibers. The illuminated fibers may be fibers associated with an increase in visible light. The illuminated fibers detected via the detection module may be the same as the one or more fibers selectively illuminated via the lighting module. In some implementations, the detection module may also detect non-illuminated fibers via the other end of the fiber optic cable. The non-illuminated fibers may be fibers that are not associated with an increase in visible light. The illuminated fibers detected via the detection module may be a subset of the one or more fibers selectively illuminated via the lighting module. In other words, for some of the fibers that were illuminated by the lighting module, the light may not pass through the entire length of the fibers (or pass through with a decreased intensity), which may be detected by the detection module. Fibers detected by the detection module that are associated with a brightness that satisfies a threshold may be considered to be illuminated fibers, whereas fibers detected by the detection module that are associated with a brightness that does not satisfy the threshold may be considered to be non-illuminated fibers.

In some implementations, the detection module may detect the illuminated fibers using the illumination pattern. The illumination pattern may indicate, to the detection module, which pixels (or positions) are being illuminated and at which time, and the detection module may use this information to perform a scan to detect illuminated fibers. The illumination pattern may be known by both the lighting module and the detection module to allow the illumination by the lighting module to be synchronized with the detection by the detection module.

As shown by reference number 108, the detection module may output information regarding the illuminated fibers and/or the non-illuminated fibers. The information may indicate which fibers associated with the fiber optic cable were illuminated. The information may indicate which fibers associated with the fiber optic cable were not illuminated. In some cases, the information may not provide any indication for a particular fiber, which may be indicative of that fiber not being detected by the detection module.

As shown by reference number 110, the computing device may generate a report, based on the information, indicating a fiber mapping between the one or more fibers that were selectively illuminated via the lighting module and the illuminated fibers detected via the detection module. The computing device may be able to determine, based on the illumination pattern, which fibers of the fiber optic cable were selectively illuminated by the lighting module. The computing device may determine, based on the information outputted by the detection module, the illuminated fibers detected by the detection module. The computing device may determine the fiber mapping, which may indicate whether the fibers that were illuminated correspond to the detected illuminated fibers. The fiber mapping may indicate, for each illuminated fiber of the fiber optic cable, whether that fiber was detected by the detection module as having a brightness that satisfies the threshold (e.g., whether that fiber qualifies as an illuminated fiber). In other words, the fiber mapping for the fiber optic cable may indicate which fibers that are selectively illuminated on one end of the fiber optic cable are also detected as illuminated fibers on the other end of the fiber optic cable.

In some implementations, when the illuminated fibers detected via the detection module correspond to (e.g., are the same as) the one or more fibers selectively illuminated via the lighting module, the report may include an indication of no breakage associated with the one or more fibers. Fibers without breakages may be considered to be good fibers. Alternatively, when the illuminated fibers detected via the detection module are a subset of the one or more fibers selectively illuminated via the lighting module, the report may include an indication of a breakage associated with certain fibers of the one or more fibers. In other words, not all of the fibers illuminated by the lighting module may be detected as illuminated fibers by the detection module, which may indicate that those fibers that were not detected are associated with breakages. The breakages may prevent light from passing through the fibers, and as a result, those fibers may not be detected as illuminated fibers by the detection module. Fibers with breakages may be considered to be bad fibers. Based on the report, those fibers may be analyzed by other instruments to measure certain parameters associated with those fibers.

In some implementations, the report may indicate the fiber configuration associated with the fiber optic cable and/or the fiber characteristics associated with the one or more fibers of the fiber optic cable. The fiber configuration may be a straight type, a crossover type, or a duplex type. The fiber characteristics may include a row spacing, a column spacing, a core size, or a cladding size. The fiber configuration and/or the fiber characteristics may be based on the illuminated fibers detected by the detection module. For example, the detection module may detect positions associated with the illuminated fibers, and such information may be relayed to the computing device. The computing device may store templates for different fiber configurations and/or fiber characteristics, where each template may indicate typical illuminated fiber positions. Based on the detected illuminated fibers and the templates, the computing device may be able to determine the fiber configuration and/or the fiber characteristics associated with the fiber optic cable. In some implementations, the fiber configuration may be previously known (e.g., the fiber configuration may be received as the input via the user interface), and the report may provide a verification of the fiber configuration. Alternatively, the fiber configuration may not be previously known, in which case the default illumination pattern may be used, and the report may provide a determination of the fiber configuration. The report may indicate the fiber configuration and/or the fiber characteristics, which may be useful to the user associated with the cable testing device.

In some implementations, the lighting module may selectively illuminate a first set of fibers in the fiber optic cable. The detection module may detect a second set of fibers, where fibers in the second set of fibers may be illuminated fibers. In some cases, the first set of fibers may fully overlap with the second set of fibers. In other words, the fibers that were illuminated by the lighting device may match with the illuminated fibers that were detected by the detection module, which may be indicative of no problems associated with the fibers that were illuminated. In other cases, the first set of fibers may only partially overlap with the second set of fibers. In other words, the fibers that were illuminated by the lighting device may not fully match with the illuminated fibers that were detected by the detection module, which may be indicative of certain fibers that were illuminated having problems. For example, those fibers may be broken, which may cause light to not pass through the fibers and be detected by the detection module.

In some implementations, one or more lenses may be inserted between the lighting module and the first connector of the fiber optic cable. The one or more lenses may direct a light emitted from the lighting module toward the one or more fibers to be illuminated. The one or more lenses may control an intensity associated with the light. The one or more lenses may aid to illuminate certain pixels with better intensity. The one or more lenses may be optional. When the one or more lenses are used, the lighting module may not be directly coupled to the first connector of the fiber optic cable, as the one or more lenses may be between the lighting module and the first connector of the fiber optic cable.

In some implementations, by using the lighting module (e.g., the combination of the light source, the collimation optics, and the LCD panel), certain fibers of the fiber optic cable may be selectively illuminated on one end of the fiber optic cable, such that the detection module on the other end of the fiber optic cable may determine which fibers are illuminated and create the fiber mapping indicating which fibers are illuminated. One end of the fibers may be placed near the lighting module, and selective pixels of the lighting module may be enabled, which may selectively pass and project the collimated light into cores of particular fibers. The lighting module may work in conjunction with the detection module, which may be on the other end of the fiber optic cable. The detection module, or the computing device in communication with the detection module, may be able to determine the fiber mapping, as the detection module may be able to detect an increase in visible light coming through the fibers. In some implementations, using the lighting module to selectively illuminate the fibers may avoid using moving components to direct light, which may be associated with less sensitivity when illuminating certain fibers. Further, a pattern of pixels matching a particular fiber configuration associated with the fiber optic cable may be lit up on the lighting module, which may allow a wide number of configurations (e.g., any configuration) of fiber optic cables to be tested without moving parts. In other words, the illumination of fibers may not be fixed to a small number of fiber configurations.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
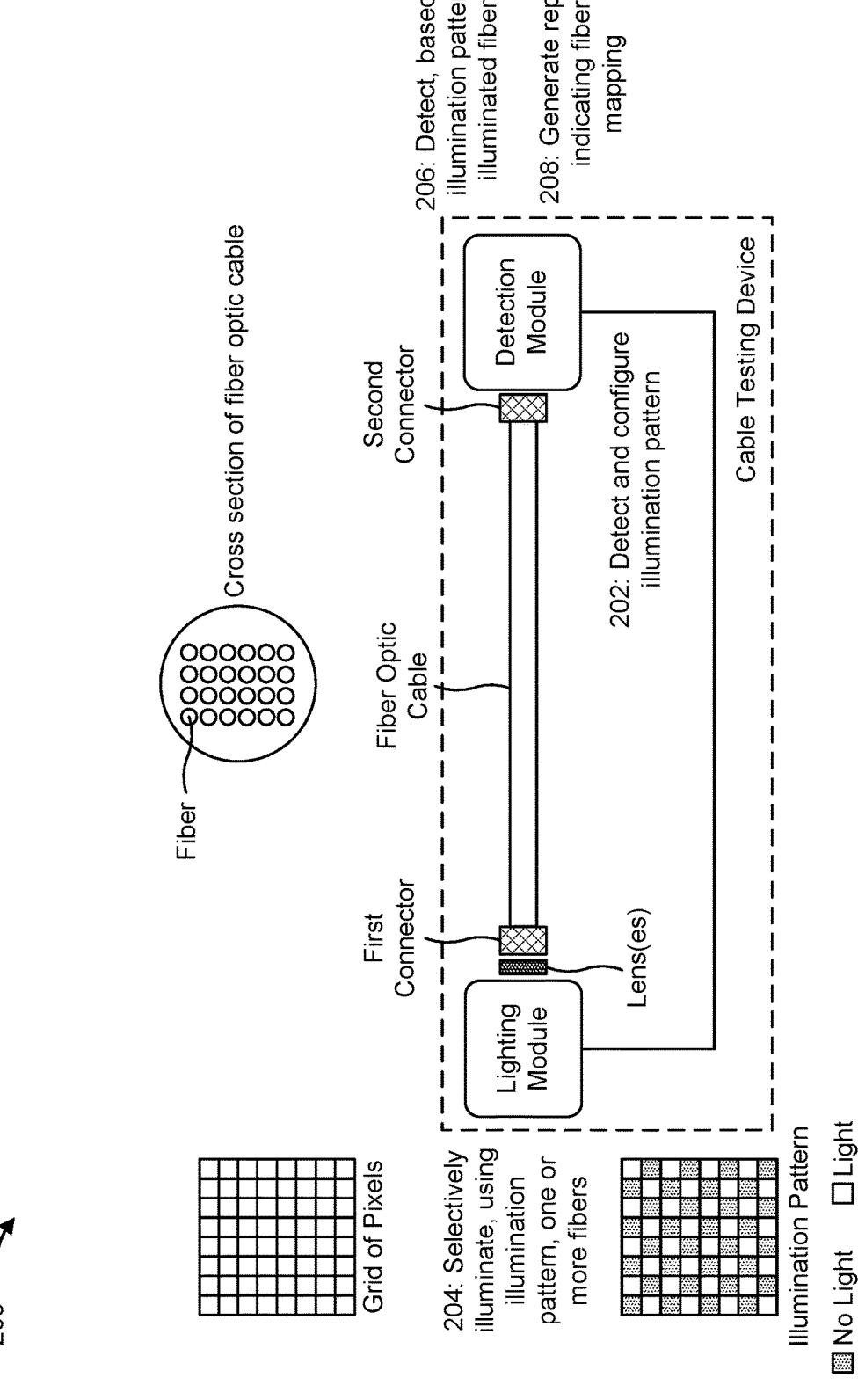
FIG. 2 is a diagram of an example associated with illuminating fibers of a fiber optic cable.

FIG. 2 is a diagram of an example 200 associated with illuminating fibers of a fiber optic cable. As shown in FIG. 2, example 200 includes a cable testing device, which may include a lighting module and a detection module. These devices are described in more detail in connection with FIGS. 3 and 4.

As shown by reference number 202, the detection module may determine an illumination pattern and configure the lighting device with the illumination pattern. The illumination pattern may be used by the lighting module when selectively illuminating one or more fibers in the fiber optic cable. The illumination pattern may be used by the detection module when detecting illuminated fibers associated with the fiber optic cable. In some implementations, the detection module may determine a fiber configuration associated with the fiber optic cable. For example, the detection module may receive an input, via a user interface, from a user associated with the cable testing device. The input may indicate the fiber configuration associated with the fiber optic cable. The detection module may select the illumination pattern based on the fiber configuration associated with the fiber optic cable. Each possible fiber configuration may be associated with a corresponding illumination pattern. The detection module may store, in a memory of the detection module, the different illumination patterns corresponding to the possible fiber configurations. In some implementations, the detection module may configure the lighting module with the illumination pattern.

As shown by reference number 204, the lighting module may selectively illuminate, using the illumination pattern, the one or more fibers in the fiber optic cable, in a similar manner as described above in connection with FIG. 1.

As shown by reference number 206, the detection module may detect, based on the illumination pattern, illuminated fibers associated with the fiber optic cable, in a similar manner as described above in connection with FIG. 1.

As shown by reference number 208, the detection module may generate a report indicating a fiber mapping between the one or more fibers that were selectively illuminated via the lighting module and the illuminated fibers detected via the detection module. The detection module may be able to determine, based on the illumination pattern, which fibers of the fiber optic cable were selectively illuminated by the lighting module. The detection module may determine the fiber mapping, which may indicate whether the fibers that were illuminated correspond to the detected illuminated fibers. The fiber mapping may indicate, for each illuminated fiber of the fiber optic cable, whether that fiber was detected by the detection module as having a brightness that satisfies the threshold (e.g., whether that fiber qualifies as an illuminated fiber). The report may be provided to the user associated with the cable testing device.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
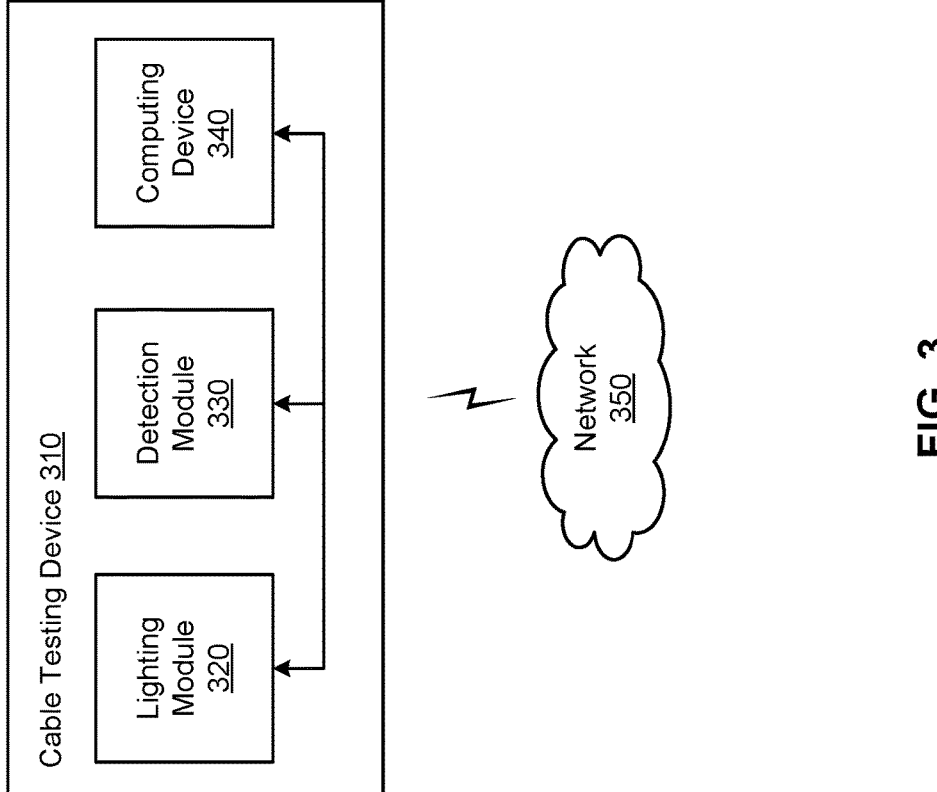
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a cable testing device 310, which may include a lighting module 320, a detection module 330, and a computing device 340, and a network 350. Devices of environment 300 may interconnect via wired connections, wireless connections, or a combination of wired and wireless connections.

The cable testing device 310 may be used to test a fiber optic cable. The cable testing device 310 may be used to determine a fiber configuration associated with the fiber optic cable. The cable testing device 310 may be used to verify the fiber configuration associated with the fiber optic cable. The cable testing device 310 may be used to create a fiber mapping for the fiber optic cable, which may indicate which fibers that are selectively illuminated on one end of the fiber optic cable are also detected as illuminated fibers on the other end of the fiber optic cable. The cable testing device 310 may be used during a manufacturing of the fiber optic cable, during an installation of the fiber optic cable, and/or during a diagnostic testing of the fiber optic cable (e.g., detecting a cause of a problem associated with the fiber optic cable).

The lighting module 320 may be configured to selectively illuminate fibers associated with a fiber optic cable. The lighting module 320 may be used to selectively illuminate the fibers on one end of the fiber optic cable. The lighting module 320 may be composed of a plurality of pixels (e.g., a grid of pixels). Certain pixels may be turned on or off in order to selectively illuminate the fibers. When a pixel is turned on, light may be emitted from the pixel. When a pixel is turned off, no light may be emitted from the pixel. The lighting module 320 may be a combination of a light source, collimation optics, and a display panel (e.g., an LCD panel).

The detection module 330 may be configured to detect illuminated fibers associated with the fiber optic cable. The detection module 330 may detect the illuminated fibers on the other end of the fiber optic cable. The detection module 330 may be an optical detection module that uses visible light and a series of lenses to generate magnified images of the other ends of the fibers. The magnified images may indicate whether the other ends of the fibers are illuminated or not illuminated.

The computing device 340 may include one or more devices capable of receiving, generating, storing, processing, and/or providing information associated with illuminating fibers of a fiber optic cable, as described elsewhere herein. The computing device 340 may include a communication device and/or a computing device. For example, the computing device 340 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 350 may include one or more wired and/or wireless networks. For example, the network 350 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 350 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
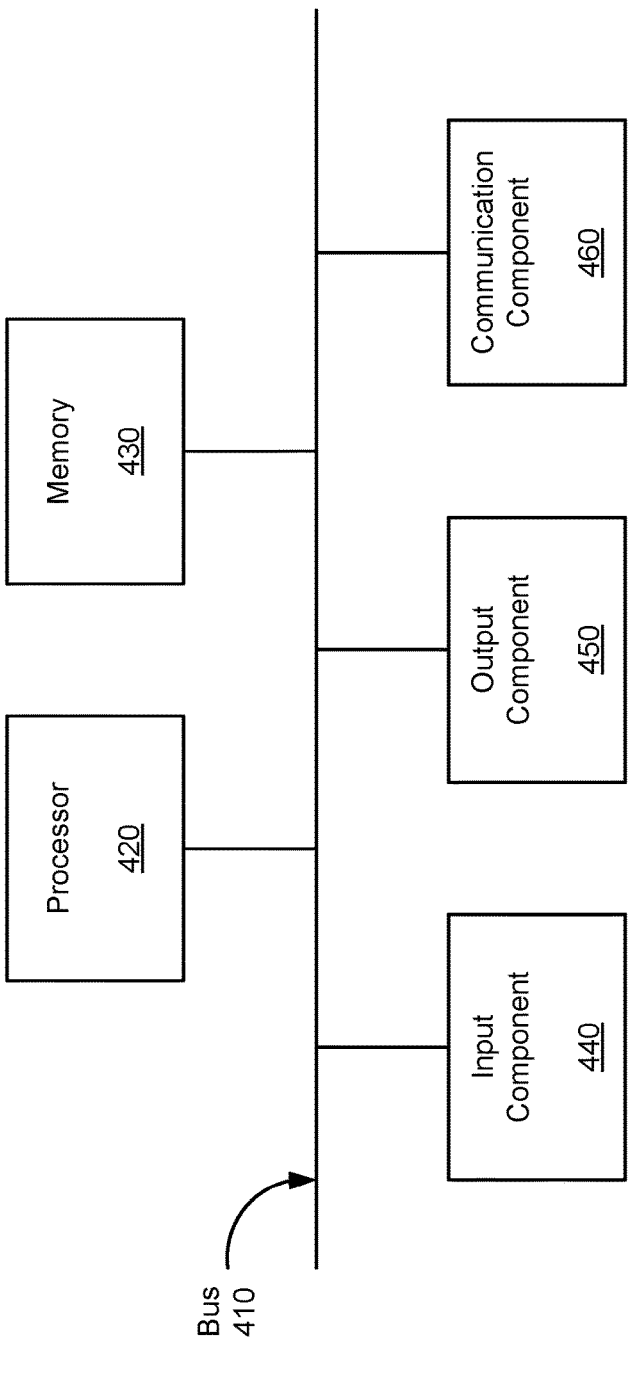
FIG. 4 is a diagram of example components of one or more devices of FIG. 3.

FIG. 4 is a diagram of example components of a device 400 associated with illuminating fibers of a fiber optic cable. The device 400 may correspond to a cable testing device (e.g., cable testing device 310), which may include a lighting module (e.g., lighting module 320), a detection module (e.g., detection module 330), and/or a computing device (e.g., computing device 340). In some implementations, the cable testing device, the lighting module, the detection module, and/or the computing device may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with illuminating fibers of a fiber optic cable. In some implementations, one or more process blocks of FIG. 5 may be performed by cable testing device (e.g., cable testing device 310), which may include a lighting module (e.g., lighting module 320), a detection module (e.g., detection module 330), and/or a computing device (e.g., computing device 340). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include illuminating, via the lighting module, one or more fibers in a fiber optic cable using an illumination pattern, wherein the fiber optic cable includes a first connector at a first end of the fiber optic cable and a second connector at a second end of the fiber optic cable (block 510). For example, the lighting module may illuminate one or more fibers in a fiber optic cable using an illumination pattern, wherein the fiber optic cable includes a first connector at a first end of the fiber optic cable and a second connector at a second end of the fiber optic cable, as described above. In some implementations, the lighting module comprises a grid of pixels, and individual pixels of the grid of pixels are turned on and off in accordance with the illumination pattern to selectively illuminate the one or more fibers.

In some implementations, the first connector is coupled to the lighting module and the second connector is coupled to the detection module. In some implementations, the first connector is positioned within a first distance from the lighting module and the second connector is positioned within a second distance from the detection module, wherein the first distance and the second distance satisfy a distance threshold.

In some implementations, process 500 may include detecting, via the detection module, illuminated fibers associated with the fiber optic cable based on the illumination pattern (block 520). For example, the detection module may detect illuminated fibers associated with the fiber optic cable based on the illumination pattern, as described above.

In some implementations, process 500 may include outputting, via the detection module, information regarding the illuminated fibers (block 530). For example, the detection module may output information regarding the illuminated fibers, as described above.

As further shown in FIG. 5, process 500 may include generating, via the computing device, a report, based on the information, indicating a fiber mapping between the one or more fibers that were selectively illuminated via the lighting module and the illuminated fibers detected via the detection module (block 540). For example, the computing device may generate a report, based on the information, indicating a fiber mapping between the one or more fibers that were selectively illuminated via the lighting module and the illuminated fibers detected via the detection module, as described above.

In some implementations, the illuminated fibers detected via the detection module correspond to (e.g., are the same as) the one or more fibers selectively illuminated via the lighting module, and the report includes an indication of no breakage associated with the one or more fibers. In some implementations, the illuminated fibers detected via the detection module are a subset of the one or more fibers selectively illuminated via the lighting module, and the report includes an indication of one or more breakages associated with certain fibers of the one or more fibers. In some implementations, the report indicates a fiber configuration associated with the fiber optic cable, or fiber characteristics associated with the fiber optic cable, wherein the fiber configuration is one of a straight type, a crossover type, or a duplex type, and the fiber characteristics include one or more of a row spacing, a column spacing, a core size, or a cladding size.

In some implementations, process 500 includes determining, via one or more processors of the device, a fiber configuration associated with the fiber optic cable; selecting, via the one or more processors of the device, the illumination pattern based on the fiber configuration associated with the fiber optic cable; and configuring, via the one or more processors of the device, one or more of the lighting module or the detection module with the illumination pattern. In some implementations, process 500 includes controlling, via one or more lenses between the lighting module and the first connector of the fiber optic cable, a light emitted from the lighting module and an intensity associated with the light.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   a lighting module comprising a grid of pixels, wherein the lighting module is configured to:
      selectively turn on one or more pixels, of the grid of pixels, in a specific order in accordance with an illumination pattern to illuminate one or more fibers, in a fiber optic cable, corresponding to the one or more pixels,
         wherein the fiber optic cable includes a first connector at a first end of the fiber optic cable and a second connector at a second end of the fiber optic cable;
   a detection module configured to:
      detect, based on the illumination pattern, illuminated fibers associated with the fiber optic cable; and
      output information regarding the illuminated fibers; and
   one or more processors configured to:
      receive, via a user interface, an input indicating a fiber configuration associated with the fiber optic cable, wherein the fiber configuration indicates an arrangement of the grid of pixels;
      select the illumination pattern based on the fiber configuration;
      configure the lighting module with the illumination pattern to enable the lighting module to selectively turn on the one or more pixels in the specific order; and
      generate a report, based on the information, indicating a fiber mapping between the one or more fibers that were illuminated via the lighting module and the illuminated fibers detected via the detection module.

2. The device of claim 1, wherein, when the illuminated fibers detected via the detection module correspond to the one or more fibers illuminated via the lighting module, the report includes an indication of no breakage associated with the one or more fibers.

3. The device of claim 1, wherein, when the illuminated fibers detected via the detection module are a subset of the one or more fibers illuminated via the lighting module, the report includes an indication of a breakage associated with certain fibers of the one or more fibers.

4. The device of claim 1, wherein the report indicates one or more of the fiber configuration, or fiber characteristics associated with the fiber optic cable, wherein the fiber configuration is one of a straight type, a crossover type, or a duplex type, and wherein the fiber characteristics include one or more of a row spacing, a column spacing, a core size, or a cladding size.

5. The device of claim 1, wherein the one or more processors are configured to:
   configure the detection module with the illumination pattern.

6. The device of claim 1, further comprising:

one or more lenses between the lighting module and the first connector of the fiber optic cable, wherein the one or more lenses are configured to direct a light emitted from the lighting module and to control an intensity associated with the light.

7. The device of claim 1, wherein the first connector is coupled to the lighting module and the second connector is coupled to the detection module.

8. The device of claim 1, wherein the first connector is positioned within a first distance from the lighting module and the second connector is positioned within a second distance from the detection module, and wherein the first distance and the second distance satisfy a distance threshold.

9. A method, comprising:

receiving, via one or more processors of a device and via a user interface, an input indicating a fiber configuration associated with a fiber optic cable, wherein the fiber configuration indicates an arrangement of a grid of pixels of a lighting module of the device;

selecting, via the one or more processors, an illumination pattern based on the fiber configuration;

configuring, via the one or more processors, the lighting module with the illumination pattern to enable the lighting module to selectively turn on one or more pixels, of the grid of pixels, in a specific order;

selectively illuminating, via the grid of pixels, one or more fibers in the fiber optic cable using the illumination pattern by selectively turning on the one or more pixels in the specific order in accordance with the illumination pattern, wherein the fiber optic cable includes a first connector at a first end of the fiber optic cable and a second connector at a second end of the fiber optic cable, and wherein the one or more fibers correspond to the one or more pixels;

detecting, via a detection module of the device, illuminated fibers associated with the fiber optic cable based on the illumination pattern;

outputting, via the detection module of the device, information regarding the illuminated fibers; and generating, via the one or more processors, a report, based on the information, indicating a fiber mapping between the one or more fibers that were selectively illuminated via the lighting module and the illuminated fibers detected via the detection module.

10. The method of claim 9, wherein, when the illuminated fibers detected via the detection module correspond to the one or more fibers selectively illuminated via the lighting module, the report includes an indication of no breakage associated with the one or more fibers.

11. The method of claim 9, wherein, when the illuminated fibers detected via the detection module are a subset of the one or more fibers selectively illuminated via the lighting module, the report includes an indication of a breakage associated with certain fibers of the one or more fibers.

12. The method of claim 9, wherein the report indicates one or more of the fiber configuration, or fiber characteristics associated with the fiber optic cable, wherein the fiber configuration is one of a straight type, a crossover type, or a duplex type, and wherein the fiber characteristics include one or more of a row spacing, a column spacing, a core size, or a cladding size.

13. The method of claim 9, further comprising:

configuring, via the one or more processors, the detection module with the illumination pattern.

14. The method of claim 9, further comprising:

controlling, via one or more lenses between the lighting module and the first connector of the fiber optic cable, a light emitted from the lighting module and an intensity associated with the light.

15. The method of claim 10, wherein the first connector is coupled to the lighting module and the second connector is coupled to the detection module.

16. The method of claim 9, wherein the first connector is positioned within a first distance from the lighting module and the second connector is positioned within a second distance from the detection module, and wherein the first distance and the second distance satisfy a distance threshold.

17. The method of claim 9, wherein the device is a mobile device useable during one or more of a manufacturing of the fiber optic cable, an installation of the fiber optic cable, or a diagnostic testing of the fiber optic cable.

18. A system, comprising:

a fiber optic cable;

a lighting module comprising a grid of pixels, wherein the lighting module is configured to:

selectively turn on one or more pixels, of the grid of pixels, in a specific order in accordance with an illumination pattern to illuminate one or more fibers, in the fiber optic cable, corresponding to the one or more pixels; and a detection module configured to:

receive, via a user interface, an input indicating a fiber configuration associated with the fiber optic cable, wherein the fiber configuration indicates an arrangement of the grid of pixels;

select the illumination pattern based on the fiber configuration;

configure the lighting module with the illumination pattern to enable the lighting module to selectively turn on the one or more pixels in the specific order;

detect, based on the illumination pattern, illuminated fibers associated with the fiber optic cable; and generate information regarding a fiber mapping between the one or more fibers that were illuminated via the lighting module and the illuminated fibers detected via the detection module.

19. The system of claim 18, wherein, when the illuminated fibers detected via the detection module correspond to the one or more fibers illuminated via the lighting module, the information includes an indication of no breakage associated with the one or more fibers.

20. The system of claim 18, wherein, when the illuminated fibers detected via the detection module are a subset of the one or more fibers illuminated via the lighting module, the information includes an indication of a breakage associated with certain fibers of the one or more fibers.

* * * * *